Figure 1:
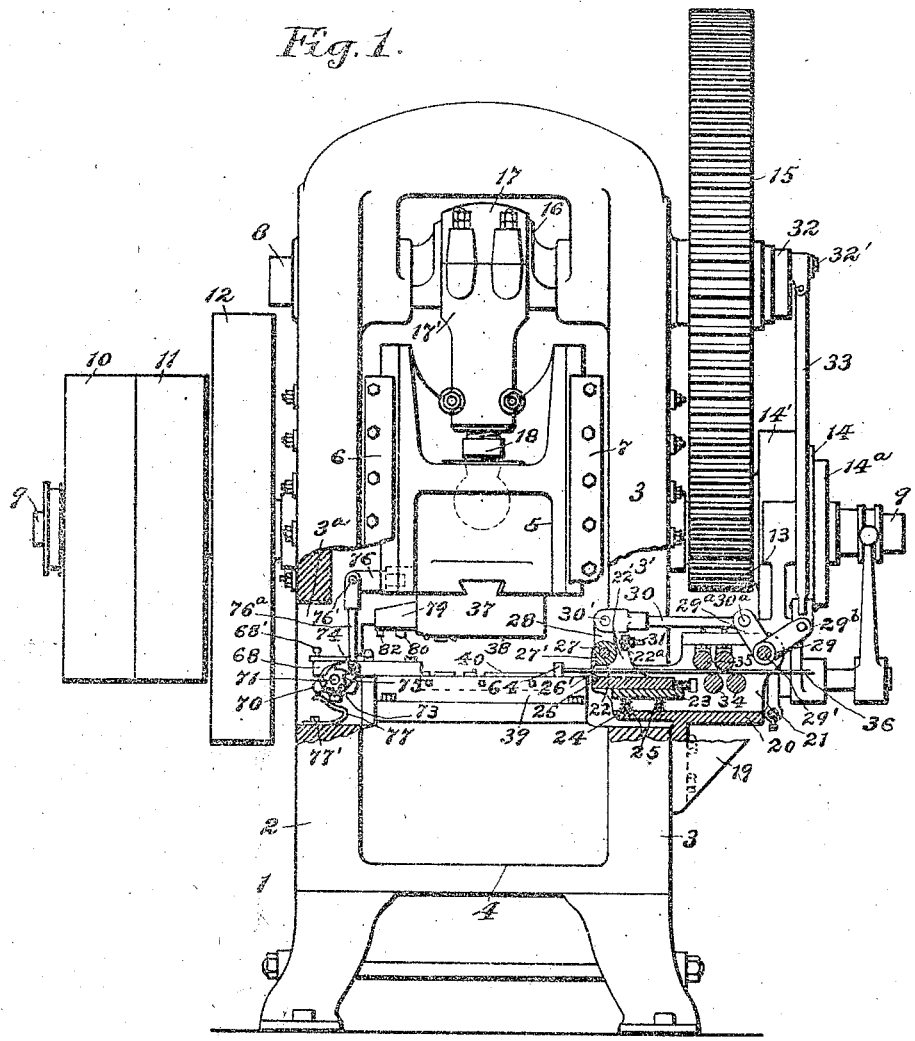

S. D. LOCKE.
PROCESS OF CORRECTING THE PITCH OF DRIVE CHAINS.
APPLICATION FILED AUG. 1, 1914.

1,139,044.

Patented May 11, 1915.
3 SHEETS—SHEET 1.

Witnesses
S. W. Brainard.
W. H. Percy.

Inventor
Sylvanus D. Locke
By Edward R. Alexander
Attorney

S. D. LOCKE.
PROCESS OF CORRECTING THE PITCH OF DRIVE CHAINS.
APPLICATION FILED AUG. 1, 1914.
1,139,044.
Patented May 11, 1915.
3 SHEETS—SHEET 2.
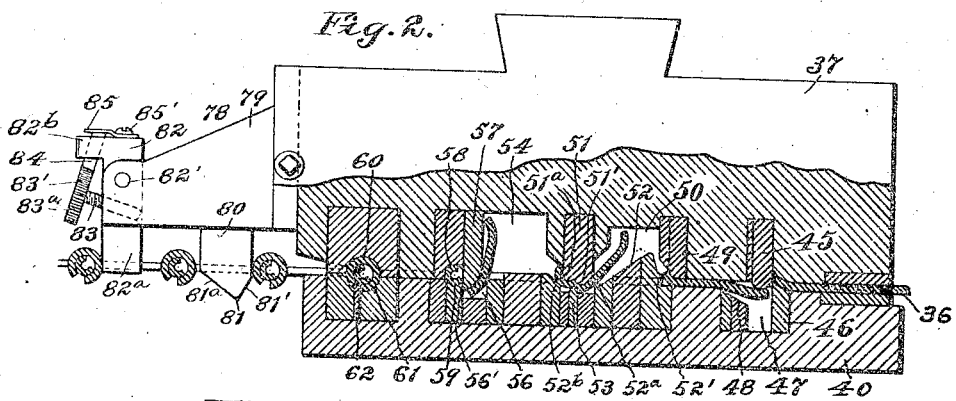
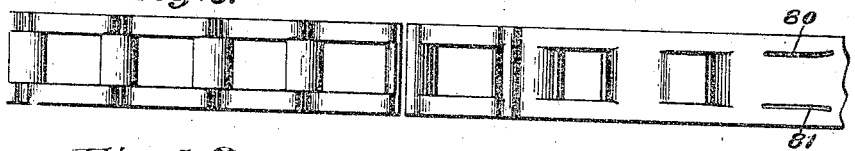
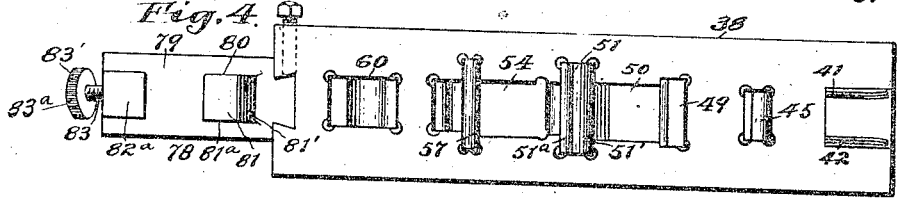
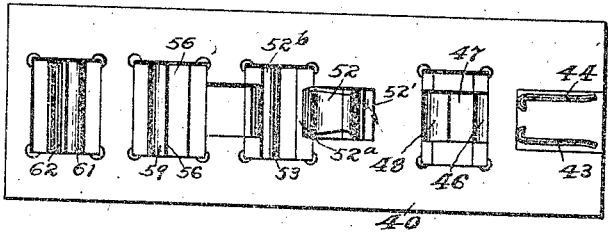

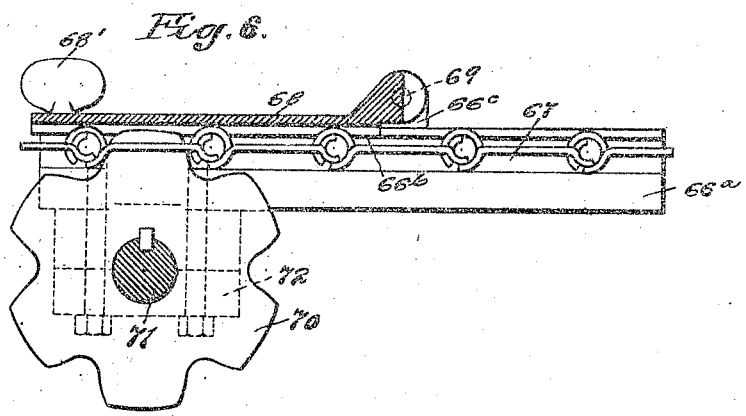
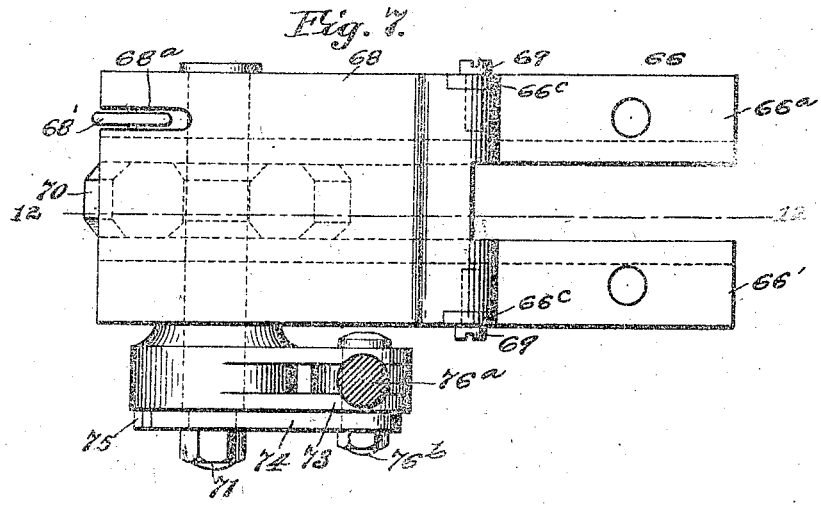

UNITED STATES PATENT OFFICE.

SYLVANUS D. LOCKE, OF BRIDGEPORT, CONNECTICUT, ASSIGNOR TO LOCKE STEEL BELT COMPANY, OF BRIDGEPORT, CONNECTICUT, A CORPORATION OF WEST VIRGINIA.

PROCESS OF CORRECTING THE PITCH OF DRIVE-CHAINS.

1,139,044.　　　　　Specification of Letters Patent.　　Patented May 11, 1915.

Original application filed June 4, 1908, Serial No. 436,711. Renewed January 17, 1914, Serial No. 812,628. Divided and this application filed August 1, 1914. Serial No. 854,501.

*To all whom it may concern:*

Be it known that I, SYLVANUS D. LOCKE, a citizen of the United States, residing at Bridgeport, in the county of Fairfield and State of Connecticut, have invented certain new and useful Improvements in the Process of Correcting the Pitch of Drive-Chains, of which the following is a specification.

This invention relates to a process for making drive chain having links of uniform pitch, each link consisting of side bars, a relatively small end bar or pintle and a relatively large end hook or sprocket bar.

It is a division of my application Serial Number 436,711, filed June 4, 1908, renewed Jan. 17, 1914.

One object of the invention is to provide a process for making drive chain in which the pitch of each link of the chain is individually corrected.

Another object of the invention is to stretch each link relative to an adjacent link to give it a definite pitch or size, whereby all the links of the chain will be of uniform pitch.

Other objects will be obvious from the following description.

My invention contemplates the formation of the individual links in any suitable manner, connecting them together one after the other in series, and then, after they are connected together, correcting the pitch of each link individually so as to make all of the links of the series of uniform pitch.

For the purpose of illustration I have selected to describe my new process in connection with the manufacture of sheet metal drive chain links, in which the end bars of each link are formed by rolling up a section of metal. With links of this character variation in pitch is quite certain to arise, due to the variations in thickness of the metal stock. In all drive chains made from sheet metal of which I am aware, and in which the links are formed in dies, the outside dimensions of the end bars as curved or rolled up by the dies, are substantially uniform. The inside dimensions, however, of the large end or sprocket bars of each link, which encircle the small end bar of an adjoining link, vary in accordance with the thickness of the metal. Consequently the thicker the metal the shorter the chain and the thinner the metal the longer the chain. If a series of links as such is subjected to a stretching action in order to make the pitch length of the series correct, there is no assurance that the individual links of the series will each be of the proper pitch; some links will be of longer pitch than others. I have, therefore, found it desirable to subject each link individually to a sizing and correcting operation so as to insure uniformity of pitch of the links irrespective of variation in thickness of the stock of metal used in their making. With sheet metal drive chain links, I preferably correct the pitch of the links immediately after they have been formed into shape from a strip of metal.

As an example of one way of carrying out my improved method in actual practice, I have herein selected to illustrate it in connection with a machine, having means for feeding a strip of metal step by step and forming and shaping the metal into connected links. I then stretch the links, one at a time, successively, as they are fed forward step by step, up to a predetermined pitch or size, each stretching or pitch correcting operation on one link being effected between it and the adjacent link or relative to the adjacent link, so that all the links are stretched uniformly.

Referring to the drawings, Figure 1 is a view, partly in elevation and partly in section, of a machine adapted for carrying out my process. Fig. 2 is an enlarged view, partly in elevation and partly in section, of the pair of dies and pitch correcting devices. Fig. 3 is an edge view showing the steps in forming a chain into links, the completed chain links being shown at the left hand end. Fig. 3ᵃ is a top plan view of the metal strip and chain shown in Fig. 3. Fig. 4 is a bottom plan view of the movable die and stretcher mechanism. Fig. 5 is a top plan view of the stationary die. Fig. 6 is a section on the line 12—12 of Fig. 7 illustrating a part of the extracting mechanism. Fig. 7 is a plan view of a portion of the extracting mechanism.

In the drawings—1 indicates as an entirety the main frame of the machine comprising uprights 2, 3, and a bed 4 arranged between the uprights.

5 is a vertically reciprocatable slide mounted to move up and down in guides 6, 7, on the main frame.

8 is a main drive shaft transversely mounted in bearings at the upper end of the frame.

9 is a countershaft transversely mounted upon the main frame and extending from one side to the other thereof. At one side of the main frame the countershaft carries a loose pulley 10, a fast pulley 11, and a fly wheel 12. At the other side of the frame the said countershaft has mounted loosely upon it a pinion 13 carrying one element 14' of a clutch 14, the other element 14ª of which is splined to the countershaft 9. Any suitable mechanism may be employed for throwing the longitudinally movable element 14ª of said clutch into and out of engagement with the element 14', so as to transmit power through the pinion 13.

15 is a gear wheel rigidly secured to said main shaft and in mesh with the pinion 13.

16 is an eccentric on the main shaft 8 connected by eccentric straps 17, 17', and pitman 18 to the slide 5.

Any suitable mechanism may be attached to the press for feeding the stock or a strip of metal indicated at 36, from which the chain links are to be formed across the bed or bolster of the press. For the purpose of illustration I have, in the drawings, shown a feed mechanism of which 19 is a bracket secured to the standard 3 of the frame and having a horizontally disposed platform 20, the inner end of which extends into a hole 3' through the standard 3.

21, 21, are side walls (only one thereof being shown) extending vertically upward, one at each side of the platform 20.

22 is a horizontally reciprocatable slide suitably mounted at either side in guideways in the said side walls 21. It rests upon a horizontally disposed friction plate 23 having downwardly extending pins 24, 24, each surrounded by a coil spring 25 bearing at its upper end against the plate 23 and at its lower end against the platform 20, so as to provide a yielding support for the slide 22, which normally tends to press the slide against the upper walls of the guideways to insure the closing of the feed jaws, to be hereinafter described, before the slide commences to move forward.

26 is a gripping piece carried by the slide 22, having an upwardly turned jaw 26' adapted to engage the under surface of the stock or strip of metal 36 to be fed across the bed or bolster.

27 is an oscillatable gripping dog having a jaw 27' adapted to engage the upper surface of the strip of metal 36 to be fed, at a point directly above the gripping jaw 26'. This gripping jaw 27 is pivotally mounted between upwardly extending lugs or ears 22', 22', (only one thereof being shown) on the slide 22, and carries an upwardly extending arm 28.

29 is a bell crank lever pivotally connected at 29' between the side walls 21 of the platform 20.

30 is a rod pivotally connected at 30' to the upper end of the arm 28, and at 30ª to the free end of the arm 29ª of the bell crank lever 29.

31 is an adjustable stop for limiting the throw of the arm 28 in clockwise direction. This stop preferably consists of a screw extending through a threaded opening in a cross bar 22ª, which latter extends between the ears 22', 22', on the slide 22.

32 is a crank disk carried by the main shaft 8 and having a crank pin 32' to which is pivotally connected one end of a connecting rod 33, the other end of which is suitably connected to the free end of the arm 29ᵇ of the bell crank lever 29.

34, 34, and 35, 35, are straightening rolls for the strip of metal or stock 36. These rolls are horizontally disposed and suitably mounted between the side walls 21, 21, on the platform 20. The strip of metal 36 is directed between the rolls 34, 34, and 35, 35, and between the gripping lips 26' and 27'. The dog 27 and arm 28 are shaped and proportioned to have a slight rocking motion relative to the slide 22, so that in normal operation, as the connecting rod 30 is drawn to the right in Fig. 1, the gripping jaw 27' is rocked out of engagement with the upper surface of the strip of metal 36. The arm 28 then engages the stop 31 and the slide 22 recedes with the connecting rod 30. Upon the reversal of travel of the rod 30, it rocks forward the upper end of the arm 28 and causes the gripping jaw 27' to engage the upper surface of the strip 36, thereby gripping the said strip firmly between the jaws 26' and 27' and the slide 22 and strip 36 are together fed forward.

Of the die forming elements, 37 is a carrier or holder for the movable die, it being suitably connected to the slide 5.

38 represents as an entirety the movable die, it being suitably seated and held in the holder 37.

39 represents a bolster or die bed for the stationary die. It is detachably secured to the bed 4 in any suitable manner.

40 represents as an entirety a stationary die suitably secured in the die bed 39. The dies 38 and 40, which coöperate with each other to form and assemble the links, are arranged in longitudinal alinement with and properly centered relative to the line of feed of the strip 36.

41, 42, are scoring knives or chisels arranged at the right hand end of the movable die 38 and adapted to impart lines of score to the upper surface of the strip of metal 36.

43, 44, are corresponding scoring knives or chisels carried by the stationary die 40 and arranged to impart lines of score to the under surface of the strip of metal, each of which lines is directly beneath a line of score imparted by one of the upper scoring knives.

Of the dies 38 and 40, 45 is a severing and crimping element on the upper die having a convex crimping surface. It is arranged to coöperate with a cutting and bending knife 46 on the lower die. The lower die is recessed at 47 in front of the cutting knife 46 and beneath the severing and crimping element 45. The metal of the stationary die 40 in front of the recess 47 is cut away along the inclined line 48 to permit a section of the metal of each link blank to be bent downwardly by the severing and crimping element 45 before it has been severed at one end by the combined action of this element and knife 46.

49 is a curved forming or crimping element on the movable die 38, about which the metal for forming the smaller end bar or pintle of each link is bent or crimped. In front of this former 49 is a recess 50, and in front of it is an irregular shaped end bar forming punch element 51 consisting of two substantial quarter circles 51', 51$^a$.

52 is a forming and bending projection on the stationary die, it being adapted to enter the recess 50 on the movable die.

52' is a shoulder on the projection 52 adapted to fold or crimp the metal for the small end of the link against the curved end of the element 49 on the movable die.

53 is a scoring knife on the stationary die adapted to impart a transverse score to the strip of metal along the line of severance of two links which are to adjoin each other and, in conjunction with the forming corners 52$^a$, 52$^b$, is adapted to force the metal of the link to follow the quarter circles 51', 51$^a$, on the former 51. This scoring knife 53 is in vertical alinement with the line of intersection of the said two quarter circles of the punch element 51. In advance of the said punch element 51 the movable die is recessed as indicated at 54 to allow clearance for the free upturning of the long lip of the metal blank for a link, which at this step of its formation projects upwardly from the metal strip. At 56 the stationary die is recessed to receive a cutting or severing knife 57 on the movable die, the edge 56' being a knife edge to work in conjunction with the knife edge 57 to sever the metal strip. Immediately in front of the cutting knife 57, the movable die is shaped as indicated at 58 to complete the rounding and formation of the small end bar of each link in coöperation with the recessed section 59 of the stationary die. At 60 the movable die is recessed for the purpose of engaging the longer section or lip of metal turned up from the central portion of each link blank and bending, curling and conforming it to the cylindrical shape desired, at the same time causing it to encircle the small end bar or pintle of the link in front of it, thereby coupling or attaching these links together. The stationary die is recessed at 61 to coöperate with the recessed portion 60 of the movable die in the final shaping and forming of the large end bar of each link.

62 is a projection extending transversely across the recessed portion 61 of the stationary die. It serves to prevent the ends of the lips of metal forming the large end or sprocket bar of each link from engaging with each other, and to space them apart a predetermined distance.

64 indicates a gage arranged to properly feed the strip of metal 36 centrally between the dies. This gage is preferably situated between the feed mechanism and the dies and is provided with U-shaped walls which cause the proper centering of the strip.

I provide suitable mechanism for extracting the links from the dies after they have been completely formed and for delivering them, one after the other, from the machine. Of this mechanism, 66 is a chain guide comprising two bars 66', 66$^a$, rigidly secured at their inner ends to the die bed 39, and projecting into the opening 3$^a$ through the adjacent wall of the main frame of the machine. These bars are longitudinally grooved and recessed, as indicated at 67 to constitute a guideway for the chain. The bars are recessed at 66$^b$ to receive a swingable cover plate 68 which is pivotally connected at 69 between upwardly projecting ears 66$^c$ on the said guide bars.

68' is a thumb nut extending through a slot 68$^a$ in the cover plate 68 and detachably fitted into the guide bar 66$^a$, for the purpose of holding down the cover plate 68 under normal conditions.

70 is a sprocket wheel arranged between and projecting between the guide bars 66', 66$^a$. It is carried by a shaft 71 mounted in bearing blocks, each detachably secured to one of the aforesaid guide bars.

73 is a pawl carrying arm loosely mounted on the shaft 71.

74 is a pawl pivotally connected to the arm 73.

75 is a ratchet wheel rigidly secured to the shaft 71 and having its teeth in the plane of the pawl 74.

76 is a lug or projection carried by the slide 5. It is pivotally connected at 76$^b$ to the arm 73.

77 is a spring having one end secured at 76' to a rod 76$^a$, the lower end of which is pivotally connected at 77' to the frame of the machine, and its other end bearing against the teeth of the sprocket wheel 70 to offer a frictional resistance to the rotation of the latter.

The sizing or pitch correcting mechanism is indicated in the drawings as an entirety by 78 and in the illustrated disclosure of my invention, is arranged to operate simultaneously with the link forming dies, thus avoiding separate operations outside of the machine for the carrying out of my process for sizing and correcting of the pitch of the links. Of this sizing or pitch correcting device, 79 is an arm extending forward from and preferably detachably secured to the die holder 37. This arm 79 has formed, preferably integrally with it, a downwardly extending finger 80 which is pointed at its lower end as indicated at 81, the rear surface 81' of the said pointed finger being shorter and at a greater inclination to the horizontal than the front surface 81ª of the said finger. This finger 80 is arranged to enter the sprocket opening in the last link but one of the links formed in the machine.

82 is a block or finger pivotally connected at 82' in the bifurcated end of the arm 79. This block or finger extends downwardly beneath the arm 79, as indicated at 82ª and is adapted to enter the sprocket opening in the link next preceding the link entered by the finger 80.

83 is an adjustment screw fitted in the finger 82 and adapted to extend on the rear side of the latter and bear against the arm 79. Its purpose is to adjust the said finger 82 about the axis of the pivot 82' and toward or from the finger 80. The adjustment wheel 83' for the screw 83 preferably has a toothed or serrated periphery 83ª.

84 is a lock pawl extending through an opening in the forward projection 82ᵇ of the finger 82 and engaging with the periphery of the thumb wheel 83' to hold the wheel at any point of adjustment.

85 is a spring bearing at one end against the lock pawl 84 and having its other end secured at 85' to the finger 82. The distance between the front wall of the downward extension 82ª of the finger 82 and the rear wall of the finger 80 remains substantially constant when the machine is in operation. If a link is shorter in pitch than it should be, these sizing fingers bring it up to proper pitch by stretching it. In practice, I have found it desirable to form and arrange the dies 38 and 40 for making of the desired and proper pitch, chain links from the thinnest sections of the strip of steel used, depending upon the stretch or pitch correcting device 78 to draw the links formed from the thicker sections of the strip of metal up to gage. In the event that it is found that the links are not of proper pitch, the adjustment of the attachment 78 or the dies to make them so can be readily and quickly made before such material has been spoiled.

The production of chain by the process just described will be readily understood. A strip of metal 36 is directed through the feed mechanism until the gripping jaws 26', 27', of the feed mechanism can engage with it. Power is then applied through the countershaft 9 to actuate the feed mechanism and slide 5. The strip 36 is guided and centered by the gage 64 so as to lie properly between the dies 38 and 40. When the slide 5 descends the scoring knives 41, 42 on the slide impart to the upper surface of the strip of metal lines of score 80, 81, as indicated in Fig. 3ª, and the scoring chisels 43, 44, on the stationary die bed impart to the under surface of the strip of metal similar lines of score. When the slide next ascends, the feed mechanism feeds forward the strip of metal one step and the first forming elements of the dies operate on the strip. The strip is fed forward step by step at each elevation of the slide, the dies operating on each link blank to form a completed link. After the first completed link has been formed, the operator extracts it from the dies and positions it to be coupled to the next succeeding link. The operator continues to extract and advance the links thus formed and coupled together until the first one of said links is engaged by a tooth on the sprocket wheel 70. Thereafter the extracting mechanism operates to automatically extract the chain links from the dies and advance them one step at a time.

With the particular set of forming dies illustrated in the drawings, I have found it advisable to have the extracting mechanism operate to draw the last formed link forward so that its small end bar is slightly in front of its proper position to be coupled to the next link to be formed. This is done in order to facilitate the proper forward feed of the metal strip for operation upon it by the forming elements which complete the forming of a link. As the slide descends after the last formed link has been extracted by the extracting mechanism, the inclined surface 81' of the pitch correcting finger 80 engages the large end bar of said link and presses the link rearwardly until its small bar is properly centered relative to the final link forming elements of the dies. The pitch correcting or sizing fingers 80, 82, operate at each descent of the slide to enter two coupled links in the chain guide 66 and stretch the links up to gage, or size them as required.

To those skilled in the art of correcting the pitch of drive chain, many alterations and widely differing embodiments and applications of my invention will suggest themselves without departing from the scope and spirit thereof. My disclosures and description herein are purely illustrative and are not intended to be in any sense limiting.

What I claim is:

1. The process of making drive chain having links of uniform pitch, each link consisting of side bars, a relatively small end bar or pintle, and a relatively large end hook or sprocket bar, which consists in forming the links, connecting them together in series, and then holding each link of the series successively while correcting the pitch of an adjoining link.

2. The process of making drive chain having links of uniform pitch, each link consisting of side bars, a relatively small end bar or pintle, and a relatively large end hook or sprocket bar, which consists in forming the links, connecting them together in series, and then individually correcting the pitch of each link of the series successively.

3. The process of making drive chain having links of uniform pitch, each link consisting of side bars, a relatively small end bar or pintle, and a relatively large end hook or sprocket bar, which consists in forming the links, connecting them together in series, and then holding each link of the series one after the other, and correcting individually the pitch of another link in the series.

4. The process of making drive chain having links of uniform pitch, each link consisting of side bars, a relatively small end bar or pintle, and a relatively large end hook or sprocket bar, which consists in forming the links, connecting them together in series, and then stretching each link relative to an adjoining link to correct its pitch.

5. The process of making drive chain having links of uniform pitch, each link consisting of side bars, a relatively small end bar or pintle, and a relatively large end hook or sprocket bar, which consists in forming the links, connecting them together in series, and then stretching the links individually and successively to correct and make their pitch uniform.

6. The process of making drive chain having links of uniform pitch, each link consisting of side bars, a relatively small end bar or pintle, and a relatively large end hook or sprocket bar, which consists in forming the links, connecting them together in series, and then stretching the large end bar of each link of the series, one after the other, to make the pitch of the links uniform.

7. The process of making drive chain having links of uniform pitch, which consists in feeding a strip of metal forward, then scoring the strip of metal and severing, crimping and shaping portions thereof to form a link having side bars, a relatively small end bar and a relatively large end bar or end hook, with the latter encircling the relatively small end bar of the adjoining link, and finally stretching each link individually to correct the pitch thereof.

SYLVANUS D. LOCKE.

Witnesses:
J. V. CORNWALL,
O. J. OSBORNE.